United States Patent [19]

Ashida et al.

[11] 4,280,137

[45] Jul. 21, 1981

[54] METHOD AND APPARATUS FOR AUTOMATICALLY CONTROLLING ARC WELDING

[75] Inventors: Eiji Ashida; Masayasu Nihei; Hiroshi Wachi, all of Hitachi; Akira Sato, Takahagi; Satoshi Kokura, Hitachiota, all of Japan

[73] Assignee: Hitachi, Ltd., Tokyo, Japan

[21] Appl. No.: 5,075

[22] Filed: Jan. 22, 1979

[30] Foreign Application Priority Data

Jan. 25, 1978 [JP] Japan .................................. 53-6229

[51] Int. Cl.³ ............................................ H04N 7/18
[52] U.S. Cl. .............................. 358/101; 219/124.34; 219/130.01
[58] Field of Search ................. 358/101, 106, 93, 100, 358/108; 219/124, 34, 124.22, 124.33, 130.01; 228/8, 9, 102, 105

[56] References Cited

U.S. PATENT DOCUMENTS

| | | | |
|---|---|---|---|
| 2,971,093 | 2/1961 | Garbuny | 358/81 |
| 3,271,558 | 9/1966 | Davis | 219/130.01 |
| 3,370,151 | 2/1968 | Normando | 219/124.34 |
| 3,526,748 | 9/1970 | Rienks | 219/130.01 |
| 3,532,807 | 10/1970 | Webb | 358/101 |
| 4,021,840 | 5/1977 | Ellsworth et al. | 358/101 |
| 4,093,844 | 6/1978 | Fellure et al. | 358/101 |
| 4,168,430 | 9/1979 | Denis et al. | 358/101 |

FOREIGN PATENT DOCUMENTS 429911 10/1974 U.S.S.R. .............................. 219/124.34

OTHER PUBLICATIONS

Kudryavtsev et al.,-Regulating Arc Welding Settings by Radiation from the Fusion Zone-Weld Prod., vol. 7, #7, Jul., 1970.

Primary Examiner—Joseph A. Orsino, Jr.
Attorney, Agent, or Firm—Thomas E. Beall, Jr.

[57] ABSTRACT

Disclosed is a method and apparatus for automatically controlling arc welding, wherein pieces of optical information provided by at least two bands of different wavelengths of light radiated from a weld area being arc-welded under predetermined welding conditions are alternately picked up by an optical device to extract various weld factors representing the actual status of the weld area from these pieces of optical information, and the extracted weld factors representing the actual status of the weld area are compared with the desired values of the weld factors representing the desired status of the weld area to compute the error or errors of the welding conditions, so that the welding conditions can be corrected on the basis of the detected error or errors of the welding conditions, whereby the weld factors can be controlled to the desired values.

12 Claims, 16 Drawing Figures

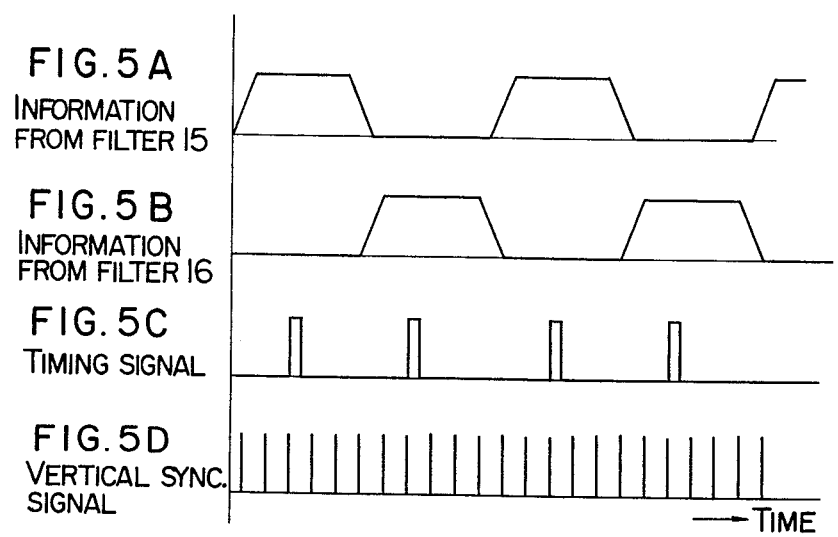
FIG.5A INFORMATION FROM FILTER 15
FIG.5B INFORMATION FROM FILTER 16
FIG.5C TIMING SIGNAL
FIG.5D VERTICAL SYNC. SIGNAL
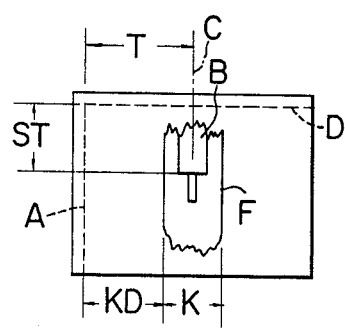
FIG.6A
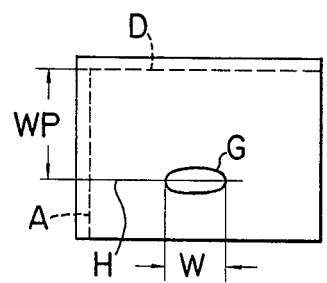
FIG.6B

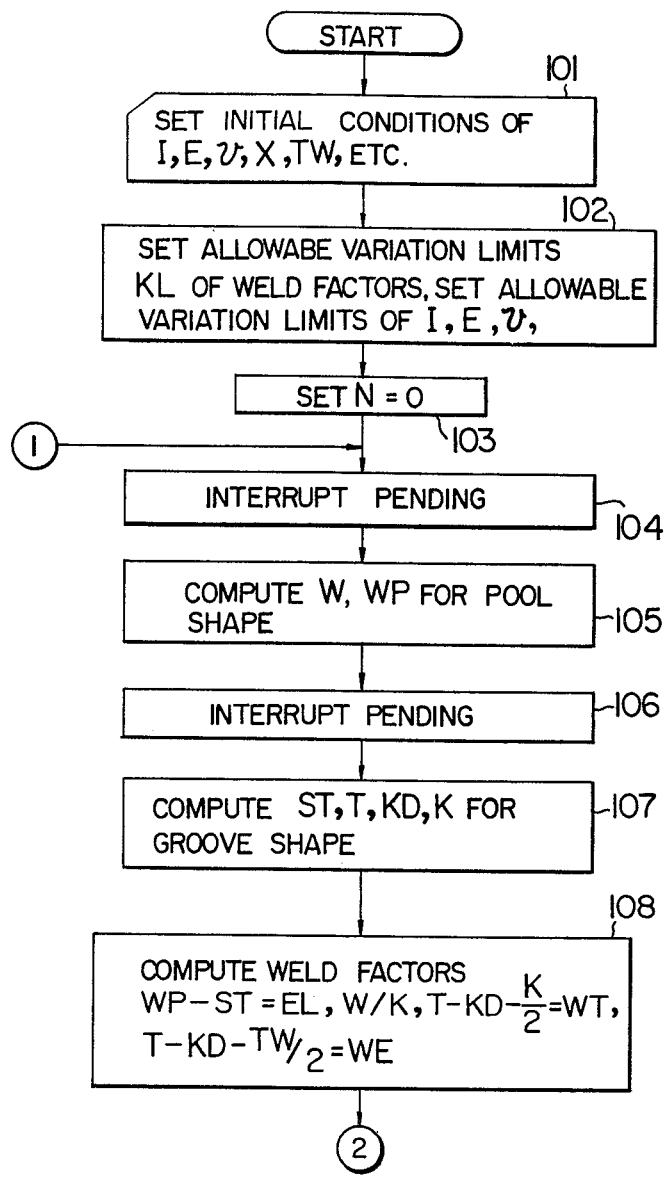

METHOD AND APPARATUS FOR AUTOMATICALLY CONTROLLING ARC WELDING

This invention relates to a method and apparatus for automatically controlling arc welding in which an optical unit such as a television camera is used to pick up optical information of a weld area being welded by arc welding so as to automatically control the welding conditions on the basis of the optical information. More particularly, this invention relates to a method and apparatus for automatically controlling arc welding which can reliably pick up a plurality of weld factors representing the actual status of a weld area being welded by arc welding and which can therefore realize an automatic arc welding operation.

It is necessary for the automation of arc welding to detect various weld factors representing the actual status of a weld area being welded by arc welding, including the shape of the groove (joint geometry), the physical position of the weld torch, the shape of the molten pool and the state of the arc, to correct the welding conditions including the welding current, arc voltage, welding speed and filler wire feed rate on the basis of the detected weld factors, and to operate the arc welding unit according to the corrected welding conditions.

Various sensors of mechanical, electro-magnetic, optical and other types have heretofore been proposed to detect variations in such various weld factors. However, the more complex the status of a weld to be arc-welded, it has been more difficult for such sensors of simple structure to accurately detect various weld factors, and expensive sensors of very complex structure have been required for the desired accurate detection. It is therefore a recent tendency to employ an optical unit such as a television camera for detecting the weld factors since the television camera can directly observe the actual status of a weld area without making any detecting contact therewith. However, when the optical unit such as the television camera is used for observing a weld area being welded by arc welding, a problem arises from the fact that the high contrast ratio between the highly luminous arc portion and the remaining portion makes it unable to obtain a clear image of the weld area. Thus, it is a common practice to direct beams of light toward the weld area to compress the high contrast ratio thereby observing a satisfactorily clear image. Further, it is known to direct beams of light toward the joint area (weld area) to be welded thereby tracing the weld line on the basis of the detected contrast of the light at the weld area.

A typical example of such a method is disclosed in U.S. Pat. No. 3,532,807. According to the disclosure of this U.S. patent, beams of light are directed toward a weld area being welded by arc welding, and the shape of the groove is detected by a television camera and monitored on a television monitor so that, on the basis of the information of the detected shape of the groove, the horizontal position of the weld torch can be automatically controlled to be located at the center of the groove. The image obtained by this method is sufficiently clear to such an extent that the operator can judge the state of arc welding by observing the image on the television monitor by his eye. However, this method has had such drawbacks that optical noises including an optical spattering noise are frequently included in the optical information which are processed to obtain electrical signals used for the control of the arc welding, and the poor clearness and high contrast of the image results in an inability of obtaining accurate information and also in a low reliability of arc welding control. It has therefore been difficult to cause accurate tracking movement of the weld torch along the weld line. While this method has been applicable satisfactorily to a groove of I-shape in that the groove shape can be relatively easily detected, difficulty has been encountered in the detection of a groove shape such as a groove of a butt joint or a groove of V-shape, -shape or X-shape, and it has had a low reliability for the control of the weld torch during arc welding on a joint having such a complex groove shape. Further, the poor clearness and high contrast of the displayed image has made it difficult to observe the weld factors representing the shape of the molten pool and the shape of the arc.

In an effort to obviate such difficulties, a method entitled "Television Camera for Arc Welding" is disclosed in Japanese Patent Application No. 51-155252 filed by Shin-Nippon Seitetsu Kabushiki Kaisha (Shin-Nippon Steel Co., Ltd.) on Dec. 23, 1976 and laid open as Japanese Patent Application Kokai (Laid-Open) No. 53-78721 on July 12, 1978. Based upon the fact that light radiated from a weld area being welded by arc welding has a wide wavelength distribution including different wavelengths, namely the spectra of the weld factors such as the weld arc, molten pool, groove differ one another, the method comprises disposing optical filters in front of a television camera, picking up optical information provided by wavelengths representing the desired weld factors from the light radiated from the weld area, and observing the desired weld factors on a television monitor. However, according to this application, the image picked up by the television camera has only been observed on the television monitor by the eye of the operator, and the operator has manually controlled the welding conditions by judging the state of welding from the image displayed on the television monitor.

It is therefore a primary object of the present invention to provide a novel and improved method and apparatus for automatically controlling arc welding, which can pick up many pieces of optical information to detect various weld factors representing the actual status of a weld area being welded by arc welding and which can automatically control the welding conditions on the basis of these detected weld factors without being adversely affected by optical or any other noises and with a higher reliability, than hitherto.

The present invention which attains the above object is featured by the fact that pieces of optical information provided by at least two bands of different wavelengths of light radiated from a weld area being arc-welded under predetermined welding conditions are alternately picked up by an optical device to extract various weld factors representing the actual status of the weld area from these pieces of optical information, and the extracted weld factors representing the actual status of the weld area are compared with the desired values of the weld factors representing desired status of the weld area to compute error or errors of the welding conditions, so that the welding conditions can be corrected on the basis of the detected error or errors of the welding conditions whereby the weld factors can be controlled to the desired values.

The above and other objects, features and advantages of the present invention will become more apparent from the following detailed description taken in conjunction with the accompanying drawings, in which:

FIGS. 5A to 5D are a timing chart showing the timing of application of a video signal to the video processing device shown in FIG. 2;

FIGS. 6A and 6B illustrate images of the weld area provided by the optical device shown in FIG. 2;

FIGS. 8A and 8B are a flow chart of the video processing, weld factor computing and control sequence in the video processing device shown in FIG. 2;

A preferred embodiment of the method and apparatus for automatically controlling arc welding according to the present invention will now be described in detail with reference to the drawings.

Figure 1:
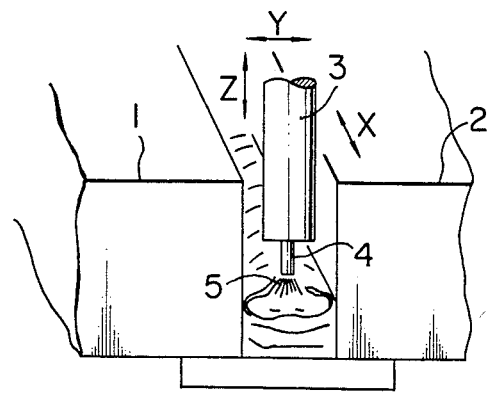
FIG. 1 is a schematic perspective of a weld area being welded by arc welding.

FIG. 1 is a schematic perspective view of a weld area being welded by an arc welding unit, and a groove of I-shape is illustrated by way of example. Referring to FIG. 1, two workpieces 1 and 2 to be welded together are spaced apart by a predetermined distance from each other to define a groove of I-shape therebetween. A weld torch (in the specific example a welding nozzle or electrode of the non-consumable type) 3 is inserted in the I-shaped groove defined between the workpieces 1 and 2, and a filler wire 4 is fed toward the weld area from the end of the welding nozzle 3 to be fused by an arc 5 which jumps across the filler wire 4 and the workpieces 1 and 2. The weld torch 3 is driven in a direction or in the Y-direction transverse with respect to the groove to make tracking movement along the weld line and is also driven in the Z-direction to be regulated in its height relative to the groove. Further, the weld torch is driven in the X-direction to provide the weld by arc welding. In this arc welding, the filler wire 4 is continuously fed throughout the welding operation. For the automatic control of the arc welding, it is necessary to detect variations in the width of the groove, the physical position of the weld torch, the extension, the width of the molten pool and other factors by a sensor so as to control these weld factors.

Figure 2:
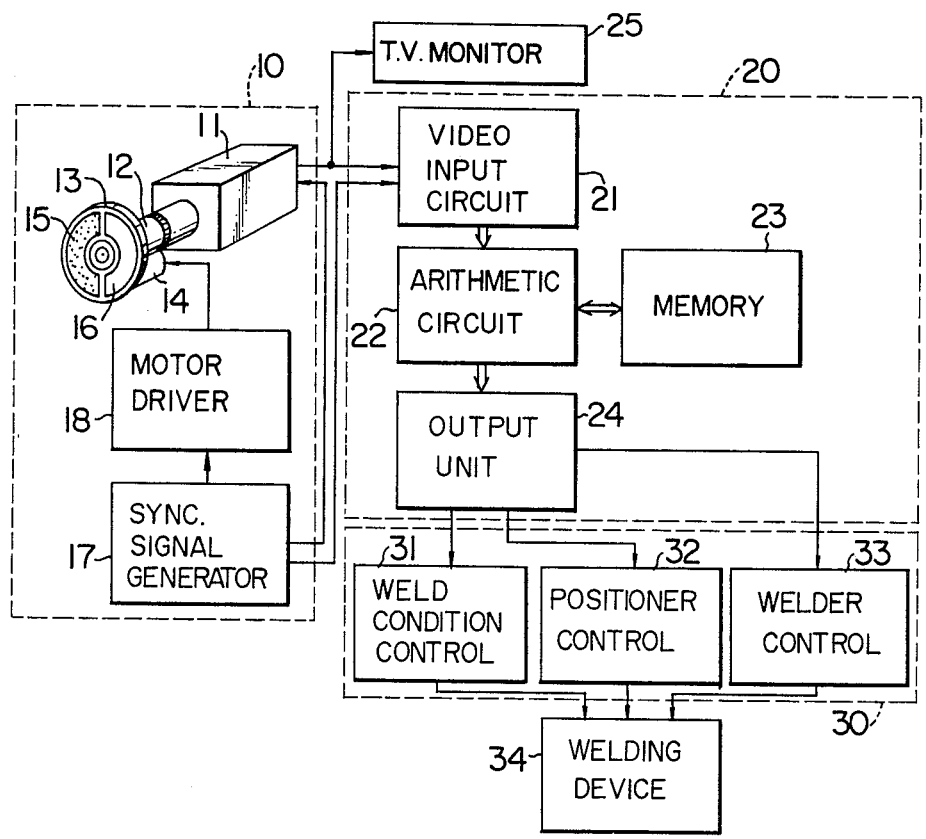
FIG. 2 is a block diagram of a typical embodiment of the automatic arc welding control apparatus according to the present invention.

FIG. 2 is a block diagram of an embodiment of the automatic arc welding control apparatus according to the present invention, and the apparatus comprises an optical device 10, a video processing device 20 and a welding control device 30.

The optical device 10 comprises a television camera 11, a lens system 12, a filter rotating assembly 13, a filter rotating motor 14, a pair of semicircular filters 15 and 16 mounted in the filter rotating assembly 13, a synchronizing signal generator 17 and a motor driver circuit 18. The first filter 15 has a wavelength pass band of, for example, 0.5 to 0.6 μm, while the second filter 16 has a wavelength pass band higher than, for example, 1.0 μm. The synchronizing signal generator 17 applies a vertical synchronizing signal to the television camera 11, and also to the motor 14 so as to rotate the motor 14 in synchronism with the vertical synchronizing signal. The optical device 10 is preferably disposed in slanting relation above the weld area to make an angle of 40° relative to the welding direction.

Figure 3:
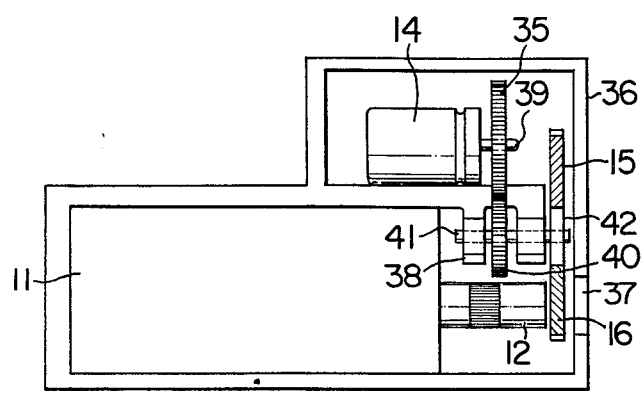
FIG. 3 is a schematic elevational view, partly in section, of one form of the filter rotating assembly in the optical device shown in FIG. 2.

FIG. 3 shows the structure of one form of the filter rotating assembly 13 shown in FIG. 2. This filter rotating assembly 13 comprises a gear 35 mounted on the shaft 39 of the motor 14, another gear 40 making meshing engagement with the gear 35 and mounted on a shaft 41 journaled in bearings 38, and a filter supporting disc 42 mounted on the shaft 41 in coaxial relation with the gear 40. The filter supporting disc 42 supports the filters 15 and 16 and is driven by the filter rotating motor 14 through the gears 35 and 40. The lens system 12 attached to the television camera 11 is disposed between the television camera 11 and the filter supporting disc 42 to receive optical information of the weld area through an aperture 37 formed in a casing 36 containing the motor 14, the television camera 11 and the filter rotating assembly 13 and through one of the filters 15 and 16. Therefore, the filters 15 and 16 are alternately brought to the filtering position in front of the lens system 12 when the filter supporting disc 42 is rotated by the motor 14 which rotates in synchronism with the vertical synchronizing signal applied from the synchronizing signal generator 17.

Figure 4:
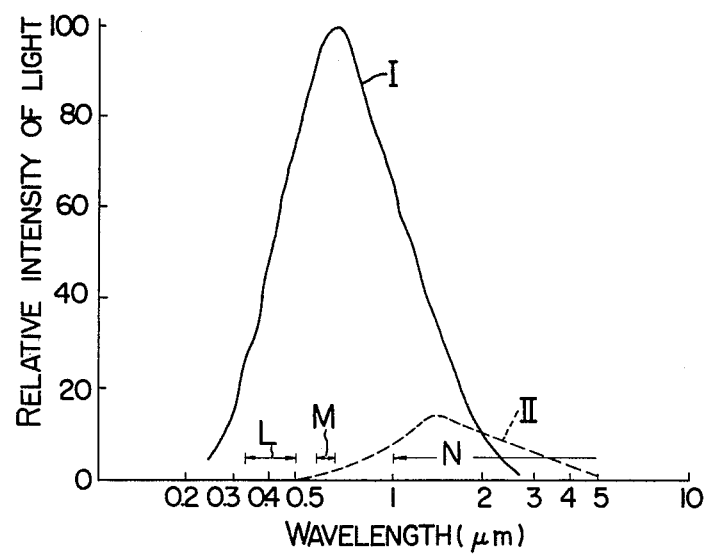
FIG. 4 is a graph showing the spectral distribution of light wavelengths providing various weld factors representing the actual status of a weld area being welded by arc welding.

Various weld factors representing the actual status of a weld area being welded by arc welding will now be discussed. FIG. 4 is a graph showing a typical spectral distribution of light wavelengths providing various weld factors representing the actual status of a weld area as shown in FIG. 1 when the workpieces 1 and 2 are members of iron. In FIG. 4, the curve I represents the spectral property of light radiated from the arc, and the curve II represents that of light radiated from the molten pool. The groove shape or joint geometry is given by a wavelength range of about 0.35 to 0.5 μm as indicated by L, and the shape of the arc is given by a wavelength range of about 0.6 to 0.7 μm as indicated by M, while the shape of the molten pool is given by a wavelength range higher than about 1.0 μm as indicated by N in FIG. 4. Therefore, the shape of the groove and the physical position of the weld torch can be detected from the light wavelengths passing through the first filter 15, and the shape of the molten pool can be detected from the light wavelengths passing through the second filter 16. A low-pass filter having a wavelength pass band lower than 0.6 μm may be used in lieu of the first filter 15 which is a band-pass filter having a wavelength pass band of 0.5 to 0.6 μm, and a band-pass filter having a wavelength pass band of about 1.0 to 2.0 μm may be used in lieu of the second filter 16 which is a high-pass filter having a wavelength pass band higher than 1.0 μm. When the metal to be welded together is other than iron, the frequency characteristics are slightly different from but generally similar to those shown in FIG. 4.

Referring to FIG. 2 again, the video processing device 20 comprises a video input circuit 21, an arithmetic circuit 22, a memory unit 23 and an output unit 24. The video output of the optical device 10 representing the optical information provided by the light passing through one of the filters 15 and 16 is sampled and converted into a binary signal which is applied to the arithmetic circuit 22. In the arithmetic circuit 22, the weld factors representing the actual status of the weld area being welded are extracted, and necessary arithmetic processing is carried out for computing the amounts of weld factors required for the welding control, such data being then stored in the memory unit 23. The filter 15 or 16 is then changed over to the filter 16 or 15 due to the rotation of the filter rotating motor 14 driven by the motor driver circuit 18 in synchronism with the vertical synchronizing signal applied from the synchronizing signal generator 17. The video output of the optical device 10 at that time is similarly applied to the video input circuit 21, and after the arithmetic processing, the data are stored in the memory unit 23. After the data obtained from the light passed through the filters 15 and 16 have been stored in the memory unit 23, the data stored in the memory unit 23 are supplied to the arithmetic circuit 22 again. In the arithmetic circuit 22, the data obtained from the light passed through the filters 15 and 16 are compared with the desired values of the weld factors representing the desired status of the weld area stored already in the memory unit 23, and the error correction signals for the correction of the welding conditions are applied from the output unit 24 to the welding control device 30. The welding conditions include the welding current, arc voltage, weld speed, extension and weld torch position. The video output of the television camera 11 may be applied to a television monitor 25 so that the state of welding can be observed on the television monitor 25 by the operator.

The rotating speed of the filter rotating assembly 13 can be determined taken the factors such as the video processing time and the residual image into consideration, and the filter rotating assembly 13 is preferably rotated to make one complete revolution per, for example, 1/6 second.

The video output of the television camera 11 is applied to the video input circuit 21 in a manner as described presently. FIGS. 5A to 5D are a timing chart illustrating the timing of application of video information from the television camera 11 to the video input circuit 21. FIG. 5A shows an optical information output of the filter 15, hence, a corresponding video information output of the television camera 11, and FIG. 5B shows an optical information output of the filter 16, hence, a corresponding video information output of the television camera 11. FIG. 5C shows a timing signal which is synchronous with the vertical synchronizing signal shown in FIG. 5D. As described hereinbefore, the motor 14 rotates in synchronism with the vertical synchronizing signal to rotate the filter supporting disc 42. Thus, the optical information of the weld area obtained from the filter 15 and the optical information of the weld area obtained from the filter 16 are supplied alternately to the television camera 11 at time intervals of a predetermined period as shown in FIGS. 5A and 5B, and such video information outputs are applied to the video input circuit 21. The timing signal (FIG. 5C) synchronous with the vertical synchronizing signal (FIG. 5D) generated by the synchronizing signal generator 17 is applied to the video input circuit 21, and in response to this timing signal, the video information outputs corresponding to the optical information outputs of the filters 15 and 16 are applied alternately to the video input circuit 21.

FIGS. 6A and 6B illustrate the images of the weld area provided by the optical information from the filters 15 and 16 respectively. More precisely, FIG. 6A illustrates the image provided by the optical information from the first filter 15, and FIG. 6B illustrates the image provided by the optical information from the second filter 16. The first filter 15 provides the optical information of the groove shape and torch position, while the second filter 16 provides the optical information of the shape of the molten pool. From the image provided by the optical information output of the first filter 15, the distance T between a vertical datum line A and the centerline C of the torch image B, the distance ST between a horizontal datum line D and the end of the torch image B, the width K of the groove image F, and the distance KD between the vertical datum line A and the associated end face of the groove image F, can be detected. From the image provided by the optical information output of the second filter 16, the width W of the molten pool image G and the distance WP between the horizontal datum line D and the horizontal centerline H of the molten pool image G can be detected. On the basis of the optical information provided by the first and second filters 15 and 16, the values including the height of the lower end of the weld torch from the molten pool, that is, the extension $X=(WP-ST)$, the ratio $W/K$ between the groove width W and the pool width K, the position of the weld torch in the groove, that is, the distance $WE=(T-DK-\frac{1}{2}TW$, where TW is the weld torch width) representing the distance between one side wall of the groove and the associated end face of the weld torch, are computed to provide the weld factors representing the actual status of the weld area being welded so that these weld factors can be used for the welding control. On the basis of the thus obtained weld factors, the values required for the correction of the welding conditions including the welding current I, arc voltage E, welding speed v, weld torch Y-position and weld torch Z-position are computed to provide a welding current control signal, an arc voltage control signal, a welding speed control signal, a weld torch Y-position control signal and a weld torch Z-position control signal which are applied from the output unit 24 to the welding control device 30.

Figure 7:
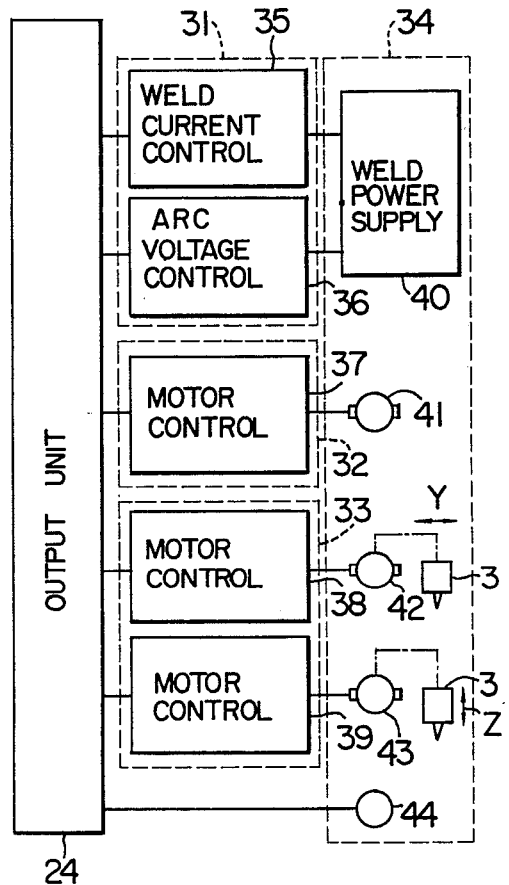
FIG. 7 is a block diagram of the welding control device and the controlled welding unit shown in FIG. 2.

As shown in FIG. 7, the welding control device 30 comprises a welding condition control unit 31, a weld torch positioner control unit 32 and a welding unit control circuit 33. In response to the control signals applied from the output unit 24, the welding control device 30 controls a welding power supply 40, a weld torch traveling motor 41, a weld torch Y-direction drive motor 42, a weld torch Z-direction drive motor 43 and an alarm lamp 44 in a welding device 34.

Referring to FIG. 7, the welding condition control unit 31 comprises a welding current control circuit 35 and an arc voltage control circuit 36 which respond to the welding current control signal and the arc voltage control signal respectively applied from the output unit 24 to suitably control the welding current I and arc voltage E supplied from the welding current supply 40 in the welding device 34.

The weld torch positioner control circuit 32 comprises a traveling motor control circuit 37 which responds to the welding speed control signal applied from the output unit 24 to control the speed of the weld torch traveling motor 41 in the welding device 34 so as to control the traveling speed of the weld torch in the X-direction, that is, in the direction along the weld line thereby suitably controlling the welding speed.

The welding unit control circuit 33 comprises a pair of motor control circuits 38 and 39 which respond to the torch Y-position control signal and the torch Z-position control signal respectively applied from the output unit 24 to drive the torch Y-direction drive motor 42 and torch Z-direction drive motor 43 thereby suitably controlling the physical position of the weld torch 3 in both the Y-direction and the Z-direction.

The alarm lamp 44 is energized in response to the application of an alarm signal from the output unit 24 alarming that an unusual condition has taken place during welding.

Figure 8B:
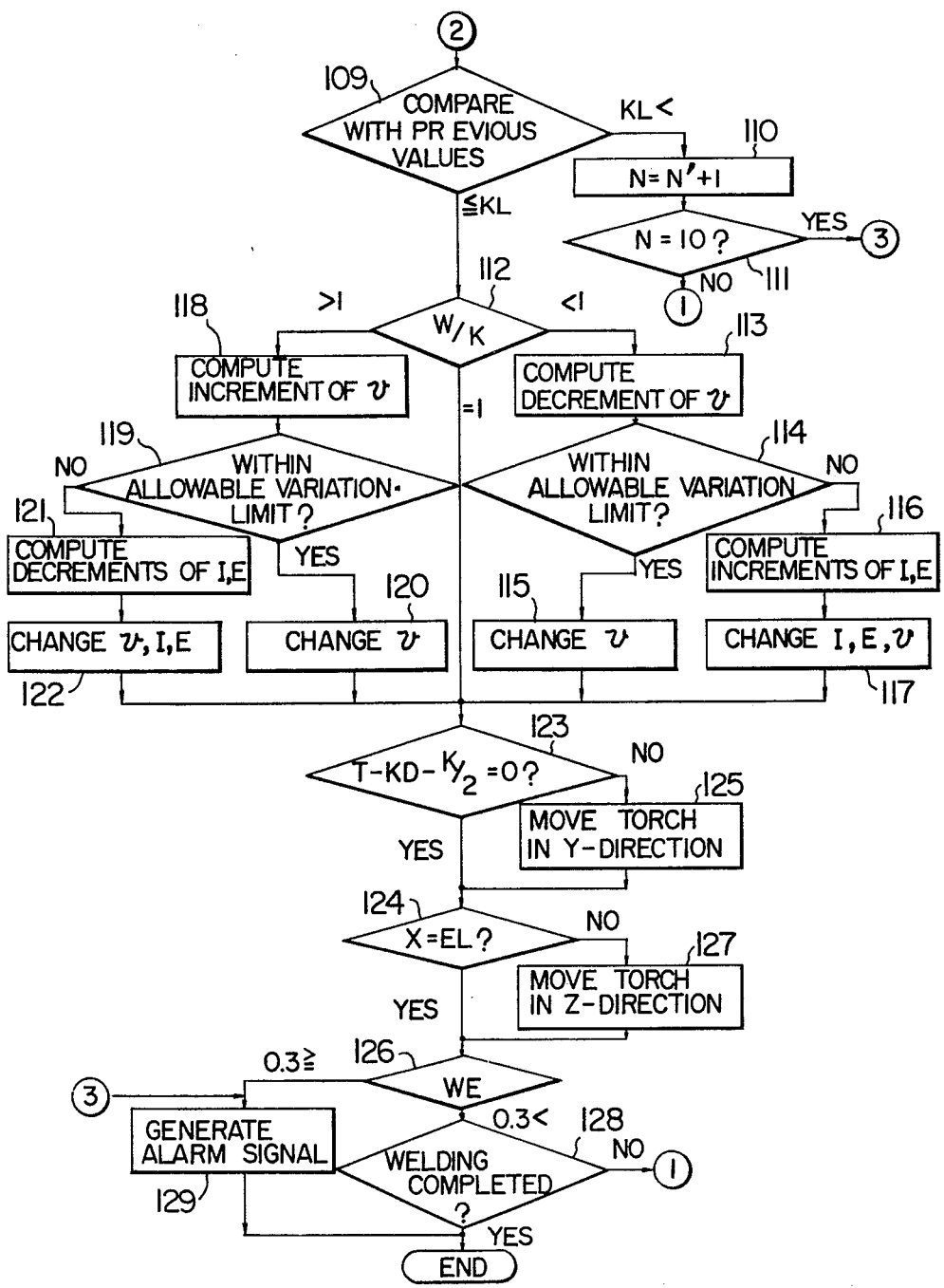

FIGS. 8A and 8B are a flow chart showing a typical example of the video processing, weld factor computing and control sequence carried out in the video processing device 20.

In step 101 in FIGS. 8A and 8B, the initial values of the welding conditions of the welding device 34 are set in the memory unit 23 before the welding device 34 is placed in operation. More precisely, the desired values of the welding current I, arc voltage E, welding speed v, extension X and weld torch width TW, etc. are externally applied to the memory unit 23 to be stored at their predetermined addresses. Further, the desired values of the weld factors representing the desired status of the weld area, $W/K=1$, $T-KD-K/2=0$ and $WE>0.3$ cm, are externally applied to the memory unit 23 to be stored at their predetermined addresses.

In step 102, allowable variation limits KL of the individual weld factors are set. This allowable variation limit KL defines the limit in percentage of allowable variation of the presently detected value of the corresponding weld factor from the previously detected value so as to determine whether the welding operation can be continuously performed. Thus, the allowable variation limits KL of the extension $EL=(WP-ST)$, the ratio W/K between the groove width W and the molten pool width K, the distance $WT=(T-KD-K/2)$ between the centerline of the molten pool width and the centerline of the weld torch, and the distance $WE=(T-KD-TW/2)$ between the side wall of the groove and the weld torch, are externally applied to the memory unit 23 to be stored at their predetermined addresses. Further, the allowable limits of the welding current I and arc voltage E determined by the capacity of the welding power supply 40, and the allowable limit of the welding speed v determined by the capacity of the motor 41 are externally applied to the memory unit 23 to be stored at their predetermined addresses.

In step 103, the number N of occurrence of unusual conditions is set at zero, and this $N=0$ is stored at a predetermined address in the memory unit 23. When any one of the detected values of the weld factors EL, W/K, WT and WE exceeds its allowable variation limit KL stored in the memory unit 23 in step 102, it is counted as occurrence of an unusual condition, and the count provides the number N of occurrence of unusual conditions.

After the above steps, the optical device 10, video processing device 20, welding control device 30 and welding device 34 are placed in operation to start arc welding according to the initial conditions set in step 101.

In step 104, the apparatus is in an interrupt pending receipt of the video information applied from the television camera 11 picked up the image through the filter 16. More precisely, the video signal of the molten pool image obtained through the filter 16 is applied from the television camera 11 to the video input circuit 21 in timed relation with the timing signal and is then successively converted into binary information to be applied to the arithmetic circuit 22 as an interrupt signal.

In step 105, the arithmetic circuit 22 computes the width W of the molten pool image G and the distance WP between the horizontal datum line D and the horizontal centerline H of the molten pool image G on the basis of the digital video signal of the molten pool applied from the video input circuit 21 to store these data in the memory unit 23.

In step 106, the apparatus is in an interrupt pending again the receipt of the video information applied from the television camera 11 picked up the image through the filter 15. The video signal of the groove image and weld torch image obtained through the filter 15 is applied from the television camera 11 to the video input circuit 21 in timed relation with the timing signal and is then successively converted into binary information to be applied to the arithmetic circuit 22 as an interrupt signal.

In step 107, the arithmetic circuit 22 computes the distance T between the vertical datum line A and the centerline C of the weld torch image B, the distance ST between the horizontal datum line D and the end of the weld torch image B, the distance KD between the vertical datum line A and the groove image F, and the width K of the groove image F on the basis of the digital video information applied from the video input circuit 21 to store these data in the memory unit 23.

Steps 106 and 107 may be carried out before steps 104 and 105, and this is done by so determining the position of the filters 15 and 16 on the filter supporting disc 42 before the devices 10, 20 and 30 are placed in operation.

In step 108, the arithmetic circuit 22 computes the extension $EL=(WP-ST)$, the ratio W/K between the groove width W and the molten pool width K, the distance $WT=(T-KD-K/2)$ between the centerline of the molten pool width K and the centerline of the weld torch width, and the distance $WE=(T-KD-TW/2)$ between the side wall of the groove and the weld torch on the basis of the data obtained in steps 105 and 107 to store these data in the memory unit 22.

In step 109, the present values of the weld factors EL, W/K, WT and WE computed in step 108 are compared with the previously computed values of these weld factors respectively so as to judge whether the difference between the present value and the previous value of each of these weld factors EL, W/K, WT and WE lies within the allowable variation limit KL. When all the differences are proved to lie within their allowable variation limits, the computed present values are judged to be correct, and the sequence proceeds to step 112. When, however, any one of the differences exceeds its allowable variation limit, it is judged that the initial setting thereof is erroneous or an unusual condition occurs in the light directed from the weld area toward the television camera 11 or a variation occurs in one of the external factors. In such a case, the sequence proceeds to step 110.

In step 110, 1 is added to the stored number N' of occurrence of unusual conditions to provide N=(N'+1) since one of the weld factors EL, W/K, WT and WE has been judged to exceed its allowable variation limit KL set in step 102.

In step 111, judgement is made to find whether the present number N=(N'+1) of occurrence of unusual conditions attains a predetermined number, for example, 10. When the number N of occurrence of unusual conditions attains the number 10, it is judged that the unusual condition has not occurred merely temporarily, and one of the devices in the control apparatus is faulty or one of the settings is erroneous. The sequence proceeds to step 129 in such a case. In step 129, an alarm signal is applied to energize the alarm lamp 44 to inform the operator of the presence of an unusual welding condition. When the number N is less than the predetermined number of 10, it is judged that an unusual condition has occurred only temporarily, and the sequence jumps back to step 104 again to repeat steps 104 to 108.

When, in step 109, the variations in the computed values of the weld factors EL, W/K, WT and WE have been proved to lie within their allowable variation limits set in step 102, all those values are judged to be correct and are used for the computation of the welding conditions.

In step 112, the value of the weld factor W/K representing the ratio between the groove width W and the molten pool width K is judged among the computed values of the weld factors EL, W/K, WT and WE. More precisely, the value of W/K computed in step 108 is compared with the desired value of W/K, i.e. 1, read out from the memory unit 23, and when the molten pool width K is proved to be equal to the groove width W, that is, when W/K=1, the molten pool width is judged to be correct, and the sequence proceeds to step 123. When the molten pool width K is proved to be smaller than the groove width W, that is, when W/K<1, the sequence proceeds to steps 113 to 117 so as to increase the molten pool width to its appropriate value. On the other hand, when the molten pool width K is proved to be larger than the groove width W, that is, when W/K>1, the sequence proceeds to steps 118 to 122 so as to decrease the molten pool width to its appropriate value.

In step 113, the decrement of the welding speed v required for increasing the molten pool width K to render it equal to the groove width W is computed.

In step 114, judgement is made to find whether the decrement computed in step 113 for decreasing the welding speed v to the required value lies within the allowable variation limit of the welding speed v set in step 102. When the welding speed decrement is proved to lie within its allowable variation limit, the sequence proceeds to step 115 in which the welding speed control signal is applied to the traveling motor control circuit 37 from the output unit 24 to decrease the rotating speed of the weld torch traveling motor 41 by the value computed in step 113. On the other hand, when the welding speed decrement is proved to exceed the allowable variation limit of the welding speed v, the sequence proceeds to step 116 which computes the increments of the welding current I and arc voltage E required for increasing the molten pool width K to render it equal to the groove width W while maintaining the decrement of the welding speed v within the allowable variation limit. In step 117, the welding speed control signal is applied to the traveling motor control circuit 37 from the output unit 24 to decrease the rotating speed of the weld torch traveling motor 41 thereby decreasing the welding speed v within its allowable variation limit, and at the same time, the welding current control signal and the arc voltage control signal are applied to the welding current control circuit 35 and to the arc voltage control circuit 36 respectively to increase the welding current I and arc voltage E of the welding power supply 40 by the values computed in step 116.

In step 118, the increment of the welding speed v required for decreasing the molten pool width K to render it equal to the groove width W is computed.

In step 119, judgement is made to find whether the increment of the welding speed v computed in step 118 lies within the allowable variation limit of the welding speed v set in step 102. When the welding speed increment is proved to lie within the allowable variation limit, the sequence proceeds to step 120 in which the welding speed control signal is applied to the traveling motor control circuit 37 from the output unit 24 to increase the rotating speed of the weld torch traveling motor 41 by the value computed in step 118. On the other hand when the welding speed increment is proved to exceed the allowable variation limit, the sequence proceeds to step 121 which computes the decrements of the welding current I and arc voltage E required for decreasing the molten pool width K to render it equal to the groove width W while maintaining the increment of the welding speed v within the allowable variation limit. In step 122, the welding speed control signal is applied to the traveling motor control circuit 37 from the output unit 24 to increase the rotating speed of the weld torch traveling motor 41 thereby increasing the welding speed v within its allowable variation limit, and at the same time, the welding current control signal and the arc voltage control signal are applied to the welding current control circuit 35 and to the arc voltage control circuit 36 respectively to decrease the welding current I and arc voltage E of the welding power supply 40 by the values computed in step 121.

In step 123, the value of (T−KD−K/2) computed in step 108 is compared with the desired value of (T−KD−K/2), i.e. 0, read out from the memory unit 23 to judge whether the centerline of the molten pool width coincides with the centerline of the weld torch width, that is, whether the relation T=(KD+K/2) is satisfied.

When the relation T=(KD+K/2) is not satisfied, the amount of movement required for moving the weld torch in the Y-direction so as to satisfy the above relation is computed in step 125, and the weld torch Y-position control signal is applied to the motor control circuit 38 from the output unit 24 to drive the weld torch Y-direction drive motor 42 thereby positioning the centerline of the weld torch width on the centerline of the width of the molten pool.

In step 124, the desired value of the extension X set in step 101 is read out from the memory unit 23 to be compared with the extension value EL computed in step 108. When the latter is proved to be equal to the former, the sequence proceeds to step 126, while when the latter is proved to be not equal to the former, the sequence proceeds to step 127.

In step 127, the amount of movement (X−EL) required for moving the weld torch in the Z-direction so as to satisfy the relation X=EL is computed, and the weld torch Z-position control signal is applied to the motor control circuit 39 from the output unit 24 to drive the weld torch Z-direction drive motor 43 thereby controlling the extension EL to be equal to the desired extension X.

In step 126, the desired value of WE is read out from the memory unit 23 to judge whether the distance WE between the side wall of the groove and the weld torch, computed in step 108, is smaller than, for example, 0.3 cm. When the distance WE is proved to exceed 0.3 cm, the sequence proceeds to step 128, while when the distance WE is proved to be equal or smaller than 0.3 cm, it is judged that continuation of the arc welding operation is impossible, and the sequence proceeds to step 129.

In step 129, an alarm signal is applied from the output unit 24 to the alarm lamp 44 to energize the lamp 44 thereby informing the operator of the fact that an unusual condition has occurred.

In step 128, the operator judges whether completion of the arc welding is externally instructed or a welding completion signal is generated from a material terminal sensor disposed at the welding end of the workpieces to be welded together. When the completion of the arc welding is externally instructed or the welding completion signal is generated, the arc welding is completed, while when the completion of the arc welding is not still externally instructed or the welding completion signal is not generated, the sequence jumps back to step 104.

Figure 9:
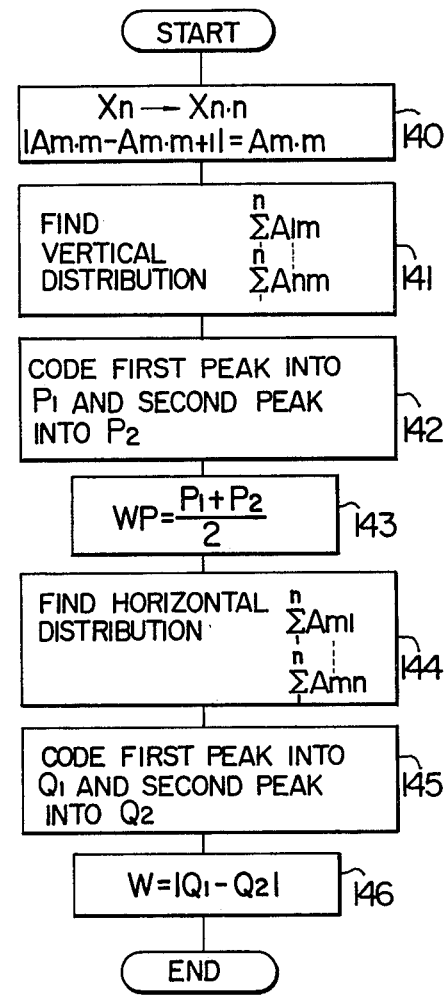
FIG. 9 is a flow chart of the molten pool shape information processing and computing sequence in the video processing device shown in FIG. 2.
Figure 10:
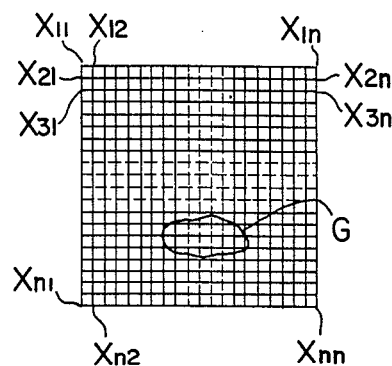
FIG. 10 shows the image of the molten pool provided by the optical information supplied from the optical device shown in FIG. 2.

As an example of computation of the weld factors W, WP, ST, T, K and KD representing the actual status of the weld area being welded by arc welding, arithmetic processing of the weld factors W and WP determining the shape of the molten pool will be described with reference to a flow chart shown in FIG. 9. FIG. 10 shows the image G of the molten pool provided by the video output of the television camera 11. The molten pool is scanned with scanning lines $x_{11}, x_{12}, \ldots, x_{1n}$; $x_{21}, x_{22}, \ldots x_{2n}; \ldots; x_{n1}, x_{n2}, \ldots, x_{nn}$ as shown in FIG. 10, and a video signal thus obtained is applied from the television camera 11 to the video input circuit 21 in which the video signal is sampled. That is, each raster is sampled at n sampling intervals to be successively converted into binary information. Thus, each raster is decomposed into n picture elements or video signal portions, and a video signal portion having a luminance higher than a predetermined level provides a binary level "1", while a video signal portion having a luminance lower than the predetermined level provides a binary level "0". The video signal portions converted into the binary levels "1" and "0" in this manner are successively supplied to the arithmetic circuit 22 to be processed according to the program shown in FIG. 9.

In step 140, a binary video signal portion supplied from the video input circuit 21 is compared in its level with the level of the next binary video signal portion before being stored in the memory unit 23. More precisely, the luminance $A_{m \cdot m}$ of a picture element $x_{m \cdot m}$ appearing at time m is compared with the luminance $A_{m \cdot m+1}$ of a picture element $x_{m \cdot m+1}$ appearing at time m+1 to obtain the difference therebetween, and its absolute value $|A_{m \cdot m} - A_{m \cdot m+1}|$ is stored in the memory unit 23 as the value of the former picture element. In FIG. 10, therefore, the picture elements defining the contour of the molten pool image G are stored in the memory unit 23 as having the luminance level "1", while the remaining picture elements are stored as having the luminance level "0", since the luminance level changes only at the contour of the molten pool.

In step 141, the luminance levels of the picture elements processed in step 140 are read out from the memory unit 23, and the arithmetic circuit 22 computes the total sum of the luminance levels of the picture elements in the horizontal direction or line direction, that is, the total sum of the luminance levels of the picture elements in each raster $(X_{11} \ldots x_{1n}, x_{21} \ldots x_{2n}, \ldots, x_{n1} \ldots x_{nn})$. Thus, the arithmetic circuit 22 computes $$\sum_{1}^{n} A_{1m}, \ldots, \sum_{1}^{n} A_{nm}$$

to find the luminance distribution in the vertical direction.

In step 142, the line exhibiting the greatest peak and that exhibiting the next greatest peak among the total sums of the luminance levels of the individual lines computed in step 141 are coded into $P_1$ and $P_2$ respectively. The code $P_1$ may be represented by m when $P_1$ corresponds to, for example, the m-th line. It will be seen that the lines exhibiting the greatest and next greatest total sums of the luminance levels of the picture elements correspond to the upper and lower extremities of the molten pool image G.

Step 143 computes the distance WP between the horizontal datum line D and the horizontal centerline H of the molten pool image G, and this is obtained by multiplying the sum of $P_1$ and $P_2$ by a factor of ½. The horizontal datum line D corresponds to the raster $(x_{11}, x_{12}, \ldots, x_{1n})$ in this case.

In step 144, the luminance levels of the picture elements obtained in step 140 are read out from the memory unit 23, and the arithmetic circuit 22 computes the total sum of the luminance levels of the picture elements in the vertical direction or column direction. Thus, the arithmetic circuit 22 computes $$\sum_{1}^{n} A_{m1}, \ldots, \sum_{1}^{n} A_{mn}$$

to find the luminance distribution in the horizontal direction.

In step 145, the column exhibiting the greatest peak and that exhibiting the next greatest peak among the total sums of the luminance levels of the individual columns computed in step 144 are coded into $Q_1$ and $Q_2$ respectively. The code $Q_1$ may be represented by m when $Q_1$ corresponds to, for example, the m-th column. It will be seen that the columns exhibiting the greatest and next greatest total sums of the luminance levels of the picture elements correspond to the right-hand and left-hand extremities of the molten pool image G.

Step 146 computes the absolute value $|Q_1 - Q_2|$ of the difference between $Q_1$ and $Q_2$, and this value represents the width W of the molten pool image G.

The weld factors W and WP representing the shape of the molten pool can be computed by the above steps. However, steps 141 to 143 may be carried out after steps 144 to 146. Although not described herein, the computation of the shape of the groove in step 107 can be similarly attained.

Figure 11:
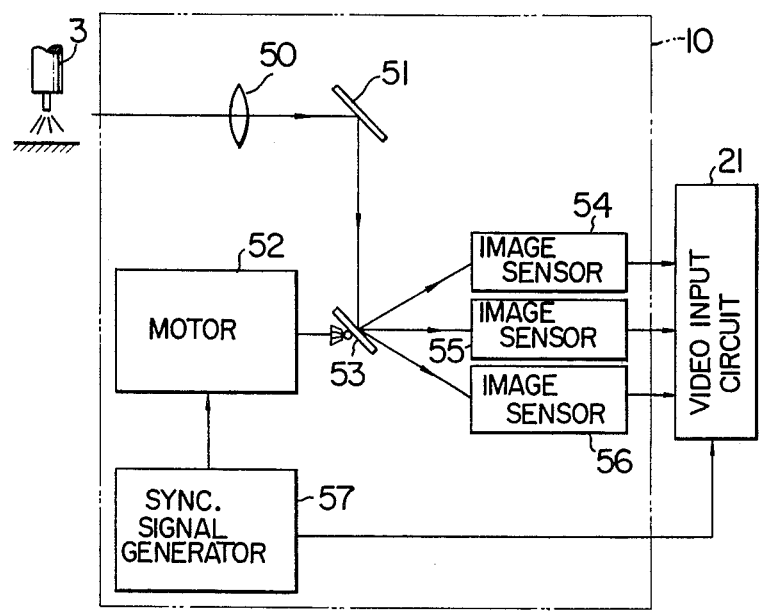
FIG. 11 is a block diagram of another form of the optical device shown in FIG. 2.

FIG. 11 shows another form of the optical device 10 used in the automatic arc welding control apparatus according to the present invention. In FIG. 11, the television camera 11 shown in FIG. 2 is replaced by a plurality of image sensors such as CCD (Charge Coupled Device) cameras or known solid element cameras.

The light from the weld area being welded by arc welding passes through a lens 50 to be reflected by a mirror 51 and is then reflected by an optical-path changing mirror 53 to be alternately incident upon a plurality of, or, for example, three image sensors 54, 55 and 56 each in the form of a CCD camera or a solid element camera. The image sensors 54, 55 and 56 have respectively different spectral properties which are selected to provide the wavelength pass bands capable of detecting the weld factors representing the actual status of the weld area including the groove image and molten pool image. For example, the image sensors 54 and 55 may have a wavelength pass band of 0.5 to 0.6 $\mu$m and a wavelength pass band higher than 1.0 $\mu$m respectively. The inclination of the optical-path changing mirror 53 is changed by an optical-path changing motor 52 driven in response to a synchronizing signal applied from a synchronizing signal generator 57.

The video signals containing the image information of the weld factors sensed by the image sensors 54, 55 and 56 are applied to the video input circuit 21 in the video processing device 20. In response to the application of the synchronizing signal from the synchronizing signal generator 57 to the video input circuit 21, the video signals containing the image information of the weld factors applied from the image sensors 54, 55 and 56 are successively converted into binary information. The manner of later processing in the video processing device 20 is similar to that described with reference to the embodiment shown in FIG. 2. Although three image sensors are illustrated in FIG. 11, two image sensors may merely be provided so that one of the image sensors senses the groove image and the torch image, while the other senses the molten pool image. Further, four or more of such image sensors may be provided to sense more weld factors.

Further, although two filters have been employed in the embodiment shown in FIG. 2, more filters having respectively different wavelength pass bands may be employed depending on the welding method so as to extract more weld factors. The filters have been arranged to be alternately brought to the filtering position by the rotating disc. However, these filters may be alternately brought to the filtering position by means such as a parallel moving means. The video signal has been converted into a binary signal in the video processing device 20. It is apparent, however, that the video signal may be quantized into several tens or more levels to more clearly represent the relative density of the image so that the weld factors used for the arc welding control can be more accurately computed.

It will be understood from the foregoing detailed description that the present invention provides a novel and improved method and apparatus for automatically controlling arc welding in which a plurality of welding conditions are automatically controlled on the basis of optical information of a weld area being welded by arc welding, which optical information is picked up by an optical unit such as a television camera. The present invention is featured by the fact that pieces of optical information provided by at least two bands of different wavelengths of light radiated from the weld area being arc-welded under predetermined welding conditions are alternately picked up by the optical unit such as the television camera to extract various weld factors representing the actual status of the weld area from these pieces of optical information, and the extracted weld factors representing the actual status of the weld area are compared with the desired values of the weld factors representing the desired status of the weld area to compute the error or errors of the welding conditions, so that the welding conditions can be corrected on the basis of the detected error or errors of the welding conditions, whereby the weld factors can be controlled to the desired values. Thus, the weld factors representing the actual status of the weld area can be extracted without producing an unclear image due to instable light radiation, without being adversely affected by optical or any other noises and with a high reliability. Further, many pieces of information can be obtained by virtue of the manner of video processing with the high reliability. Furthermore, automation of the arc welding operation can save much of the labors.

Due to the fact that the clear images of the weld area can be obtained with the high reliability, the present invention is also applicable to the extraction of the weld factors representing accurately the actual status of grooves having a shape other than the I-shape, so that the weld factors can be controlled with the reliability higher than higherto.

What we claim is:

1. A method for automatically controlling arc welding comprising the steps of:

alternately picking up, by optical means, pieces of optical information provided by at least two bands of different wavelengths of light radiated from a weld area being arc-welded under predetermined welding conditions;

extracting the weld factors representing the actual steps of the weld area from said optical information, with said weld factors including at least one of the shape of the groove, the physical position of the weld torch, the height of the lower end of the weld torch from the molten pool, the shape of the molten pool, and the shape of the arc;

comparing said extracted weld factors representing the actual status of the weld area with the desired values of the weld factors representing the desired status of the weld area so as to compute the error or errors of the welding conditions; and correcting the welding conditions on the basis of said detected error or errors of the welding conditions, whereby said weld factors can be controlled to their desired values.

2. A method as claimed in claim 1, wherein said controlled welding conditions include at least one of the welding current, the arc voltage, the weld speed, the horizontal (Y-axis) position of the weld torch, and the vertical (Z-axis) position of the weld torch.

3. A method as claimed in claim 1, wherein said pieces of optical information are provided at least by a first wavelength range of 0.5 $\mu$m to 0.6 $\mu$m and a second wavelength range higher than 1.0 $\mu$m.

4. An apparatus for automatically controlling arc welding comprising:

optical means for alternately picking up pieces of optical information provided by at least two bands of different wavelengths of light radiated from a weld area being arc-welded by a welding unit controlled according to predetermined welding conditions;

means for extracting the weld factors representing the actual status of the weld area from said optical information picked up by said optical means with said weld factors including at least one of the shape of the groove, the physical position of the weld torch, the height of the lower end of the weld torch from the molten pool, the shape of the molten pool, and the shape of the arc;

means for comparing said extracted weld factors representing the actual status of the weld area with the desired values of the weld factors representing the desired status of the weld area to compute the error or errors of the welding conditions; and means for correcting the welding conditions of said welding unit on the basis of said detected error or errors of the welding conditions, whereby said weld factors can be controlled to their desired values.

5. An apparatus as claimed in claim 4, wherein said controlled welding conditions include at least one of the welding current, the arc voltage, the weld speed, the horizontal (Y-axis) position of the weld torch, and the vertical (Z-axis) position of the weld torch.

6. An apparatus as claimed in claim 4, wherein said optical means includes at least two image sensor cameras, a synchronizing signal generator, and an optical-path changing means for alternately directing the light from the weld area toward said image sensor cameras in synchronism with the synchronizing signal generated from said synchronizing signal generator, so that the light from the weld area is received by said image sensor cameras alternately and whereby the optical information of the weld area can appear alternately from said at least two image sensor cameras.

7. An apparatus as claimed in claim 6, wherein said at least image sensor cameras have a wavelength pass band of 0.5 $\mu$m to 0.6 $\mu$m and a wavelength pass band higher than 1.0 $\mu$m respectively.

8. An apparatus as claimed in claim 6 or 7, wherein said optical-path changing means includes an optical-path changing mirror for alternately directing the light from the weld area toward said at least two image sensor cameras in synchronism with the synchronizing signal, and an optical-path changing motor for driving said optical-path changing mirror in synchronism with the synchronizing signal, and said means for extracting said weld factors representing the actual status of the weld area receives said optical information applied alternately from said image sensor cameras in synchronism with the synchronizing signal.

9. An apparatus as claimed in claim 4, wherein said optical means includes a television camera, and at least two filters disposed adjacent to a lens system of said television camera and having respectively different wavelength pass bands, said at least two filters being alternately moved to their filtering position in synchronism with the frame scanning rate of said television camera to pass said optical information of the weld area toward said television camera through said lens system.

10. An apparatus as claimed in claim 9, wherein said at least two filters have a wavelength pass band of 0.5 $\mu$m to 0.6 $\mu$m and a wavelength pass band higher than 1.0 $\mu$m respectively.

11. An apparatus as claimed in claim 9 or 10, wherein said optical means includes a television camera having a lens system incorporated therein, at least two filters disposed adjacent to said lens system and having respectively different wavelength pass bands, a driver circuit driving a motor rotating said filters, and a synchronizing signal generator generating a synchronizing signal so as to rotate said filters in synchronism with the frame scanning rate of said television camera.

12. A method for automatically controlling arc welding, comprising simultaneously conducting the steps of:

arc welding metal and producing a molten metal weld pool;

picking up, by optical means, pieces of optical information provided by at least one band of different wavelengths of light radiated from said molten pool, the different wavelengths presenting different information, being arc-welded under predetermined welding conditions;

extracting at least one weld factor representing the actual status of the weld area from said optical information, with said one weld factor being the physical shape of the molten pool;

comparing said extracted weld factor representing the actual status of the molten pool with the fixed desired value of the weld factor representing the desired status of the weld area and computing the error of the welding conditions;

correcting the welding conditions on the basis of said detected and computed error of the welding conditions, to change said weld factor to its desired value while said arc welding step is still being performed on the molten pool being detected, said controlled welding conditions including at least one of the welding current, the arc voltage, the weld speed, the horizontal (Y-axis) position of the weld torch, and the vertical axis (Z-axis) position of the weld torch; and said pieces of optical information being provided at least by a first wavelength range of 0.5 $\mu$m to 0.6 $\mu$m and a second wavelength range higher than 1.0 $\mu$m.

* * * * *